United States Patent [19]

Ulich et al.

[11] Patent Number: 4,964,721

[45] Date of Patent: Oct. 23, 1990

[54] IMAGING LIDAR SYSTEM

[75] Inventors: Bobby L. Ulich; Lonnie K. Calmes; William P. Elkins, all of Tucson, Ariz.

[73] Assignee: Kaman Aerospace Corporation, Bloomfield, Conn.

[21] Appl. No.: 420,247

[22] Filed: Oct. 12, 1989

[51] Int. Cl.5 .......................... G01C 3/08; H04N 7/00
[52] U.S. Cl. ........................................ 356/5; 250/332; 358/95
[58] Field of Search ............... 356/5; 358/95; 250/332

[56] References Cited

U.S. PATENT DOCUMENTS

| | | | |
|---|---|---|---|
| 3,446,555 | 5/1969 | Kahn | 356/5 |
| 3,527,533 | 9/1970 | Hook et al. | 356/5 |
| 3,604,803 | 9/1971 | Kahn | 356/5 |
| 3,848,999 | 11/1974 | Dall'armi | 356/5 |
| 4,862,257 | 8/1989 | Ulich | 358/95 |

Primary Examiner—Stephen C. Buczinski
Attorney, Agent, or Firm—Fishman, Dionne & Cantor

[57] ABSTRACT

A novel timing control method is utilized in conjunction with an imaging lidar system of the type disclosed in U.S. Pat. No. 4,862,257. This novel timing control is employed in applications wherein the lidar system is mounted on an airborne platform. The timing control method of this invention completely eliminates the glint detector with associated signal conditioner used in the system of U.S. Pat. No. 4,862,257, and instead, relies upon a signal derived from the aircraft altimeter to continually provide platform altitude status. Since the entire system is under the control of a computer, the altimeter signal can be interpreted and used to adjust total delay so as to automatically track changing platform altitude. It is now possible to initiate all timing from the occurrence of the laser "lamp fire" signal. The total delay to camera "gate on" is now the "lamp-to-laser" delay, plus round trip platform altitude delay (computer from the altimeter signal), plus desired water depth delay, less system delays.

10 Claims, 2 Drawing Sheets

4,964,721

IMAGING LIDAR SYSTEM

BACKGROUND OF THE INVENTION

This invention relates generally to a method and apparatus for remote imaging of objects enveloped by a backscattering medium which is at least partially transmitting to light. More particularly, this invention relates to a method for detecting and imaging underwater objects from an airborne platform using a novel imaging lidar (light detection and ranging) system.

There is a continuing need to develop methods of detecting underwater targets from remote airborne locations and over relatively short time periods. This is of particular importance in the case of certain military applications where, for example, the detection of moored mines from helicopters and other aircraft is vital to ensuring safe seas. Presently, cumbersome and time consuming wire line devices must be used. These devices are lowered into the water and of curse, are easily subject to damage and loss. Also, wire line devices make target searching relatively slow and can only detect targets without providing visual imaging.

Fortunately, an improved and novel system for remote detection and imaging of objects underwater (or objects obscured by other backscattering media which is at least partially transmitting to light such as ice, snow, fog, dust and smoke) from an airborne platform has been described in U.S. Pat. No. 4,862,257 and U.S. patent application Ser. No. 256,778 filed Oct. 12, 1988, both of which are assigned to the assignee hereof and incorporated herein by reference.

The imaging lidar system of U.S. Pat. No. 4,862,257 utilizes a laser to generate short pulses of light with pulse widths on the order of nanoseconds. The laser light is expanded by optics and projected down toward the surface of the water and to an object or target. Intensified CCD (charge coupled device) cameras are electronically shuttered after a time delay corresponding to the round trip propagation time to and from the target. This timing eliminates light scattered by the water from in front of and behind the target. As a result, the veiling luminance of the water is greatly attenuated and faint target signatures can be seen. The resulting gated images (displayed on a CRT) have sufficient spatial resolution to classify and/or identify the target. U.S. application Ser. No. 256,778 relates to an imaging lidar system intended for night vision.

An important feature of the imaging lidar system of U.S. Pat. No. 4,862,257 and U.S. application Ser. No. 256,778 is the timing control method wherein a glint detector is used to trigger gating of the intensified CCD cameras. This timing control scheme is described in detail with reference to FIG. 5 of U.S. Pat. No. 4,862,257. Referring now to both FIGS. 1 and 5 of U.S. Pat. No. 4,862,257, it will be appreciated that an important feature of the prior imaging lidar system is the short duration, electronic shuttering of intensified CCD camera 18 and/or 20 after a time delay corresponding to the round trip propagation time of a short laser pulse between the "system" and a reflecting target or scattering volume of interest. The method for establishing this time delay is as follows: A photodiode or photomultiplier 37 (see FIG. 1) detects the glint return of laser pulse "n" from the water surface. The detector signal is conditioned in amplifier 35 and used to initiate trigger of delay generator 22; the end objective being to gate the camera on (i.e. open the shutter) for the desired return of the "n+1" (next) pulse. Therefore, the total delay required is the pulse period (e.g., 67 msec for 15 Hz or 50 msec for 20 Hz laser pulse repetition frequency), plus desired water depth delay, less system delays. It has been determined that the system delays (camera response time, delay generator response time, etc.) typically exceed the desired depth delay, thus necessitating the one pulse delay. Since timing is initiated by the surface glint return, the platform altitude is always compensated (relying, of course, on the fact that any change in altitude during one pulse period is insignificant). The fact that total delay can be less than the pulse period requires that two delay generators 22 and 24 be used in series. A requirement for this timing method of U.S. Pat. No. 4,862,257 is that the frequency of the outgoing laser pulses must be extremely stable. This imposes critical requirements upon the accuracy of the system's master clock and the jitter of the laser firing electronics referenced to the laser trigger input. The result is that the time delay method of the prior imaging lidar system is relatively complicated and therefore subject to error.

SUMMARY OF THE INVENTION

The above-discussed and other problems and deficiencies of the prior art are overcome or alleviated by the improved imaging lidar system of the present invention. In accordance with the present invention, a novel timing control method is utilized in conjunction with an imaging lidar system of the type disclosed in U.S. Pat. No. 4,862,257 and U.S. patent application Ser. No. 256,778. This novel timing control is employed in applications wherein the lidar system is mounted on an airborne platform.

The timing control method of this invention completely eliminates the glint detector with associated signal conditioner, and instead, relies upon a signal derived from the aircraft altimeter to continually provide platform altitude status. Since the entire system is under the control of a computer, the altimeter signal can be interpreted and used to adjust total delay so as to automatically track changing platform altitude. In accordance with the present invention, it is now possible to initiate all timing from the occurrence of the laser "lamp fire" signal which is nominally 210 microseconds prior to the outgoing laser pulse (exact lamp-to-laser delay is under accurate control). The total delay to camera "gate on" is now the "lamp-to-laser" delay, plus round trip platform altitude delay (computed from the altimeter signal), plus desired water depth delay, less system delays.

The nominal 210 microsecond lamp-to-laser delay easily allows time for all system delays, yet keeps the total delay requirement to a small fraction of a pulse period, thus reducing the number of delay generators required from two to one. Also significant is the elimination of the demanding stability requirement upon the master clock since pulse-to-pulse timing is no longer critical. With this method, the camera exposure is triggered by the same signal used to fire the same laser pulse which the camera detects upon reflection from the target. There is no longer a need for a one pulse period delay in camera gating.

The method of the present invention thus offers significant system simplification along with some performance improvements relative to the previously discussed known imaging lidar system when mounted on an airborne platform and used to image objects obscured by a backscattering media, particularly objects underwater.

The above-discussed and other features and advantages of the present invention will be appreciated and understood from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
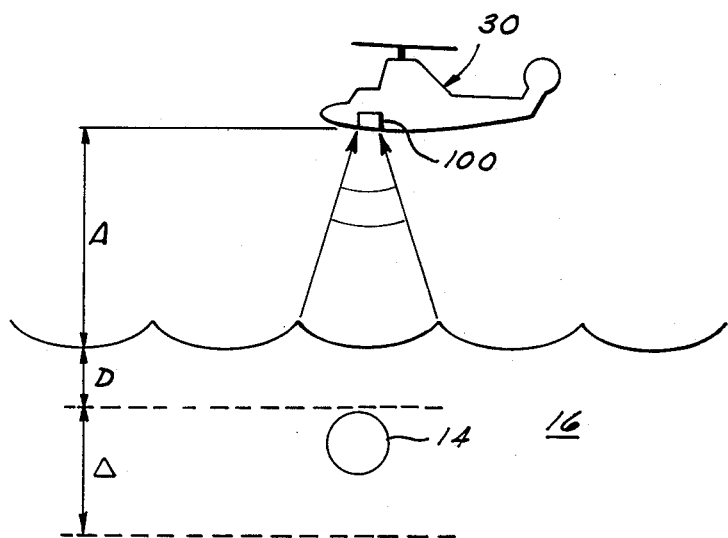
FIG. 1 is a schematic diagram of the imaging lidar used on an airborne platform in accordance with the present invention.

Referring first to FIG. 1, the present invention relates to a remote sensing unit identified generally at 100 positioned on an airborne platform such as helicopter 30 and used for detecting and imaging targets and other objects 14 submerged in water 16 or obscured in conditions where atmospheric propagation of visible light is severely hampered by fog, dust, smoke, haze, snow and the like.

Figure 2:
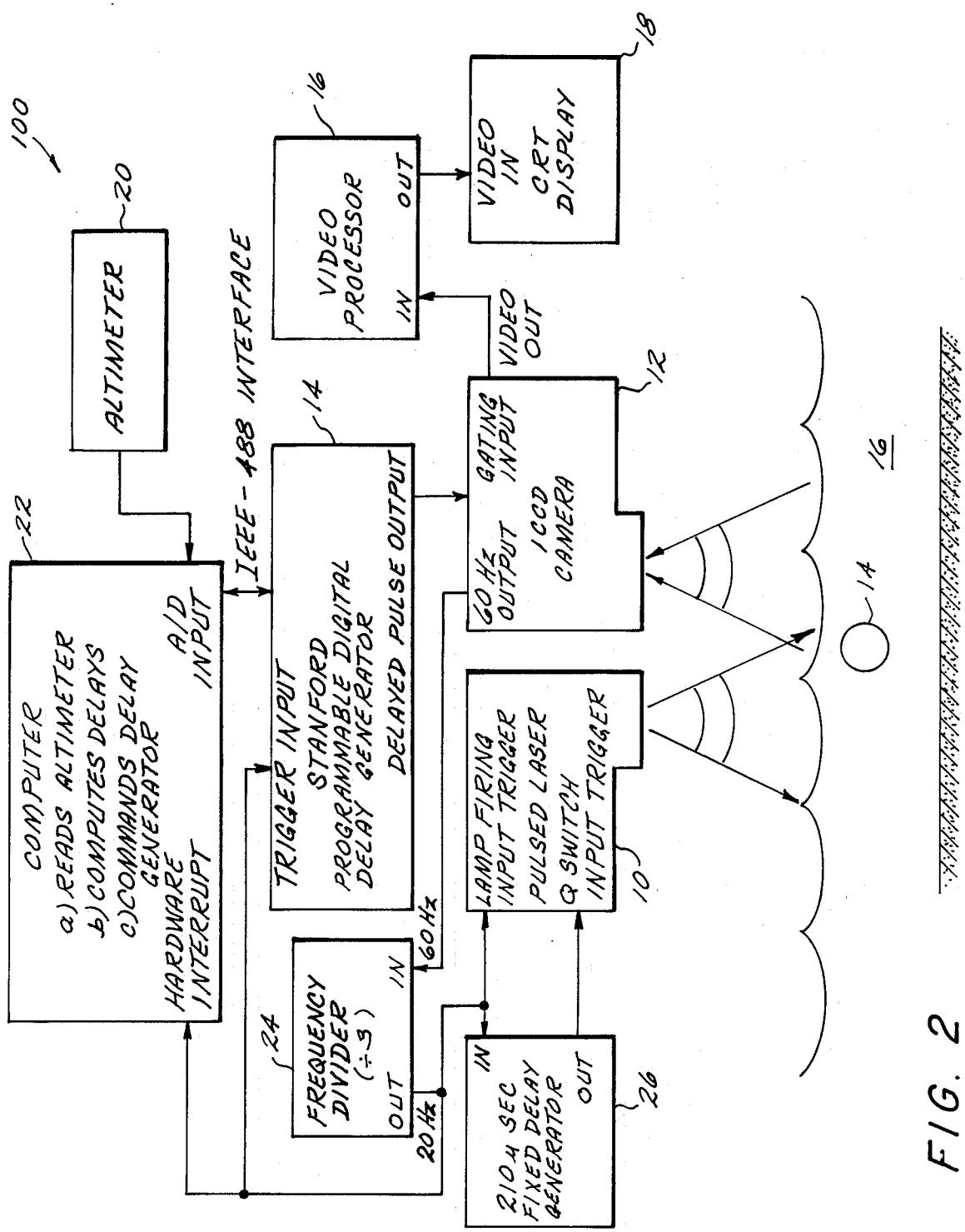
FIG. 2 is a schematic block diagram of the system for detecting and imaging targets in accordance with the present invention.

Referring now to FIG. 2, the present invention generally comprises a pulsed laser 10 which operates at a wavelength which may either be visible or invisible to the human eye (more than 900 nm), a fast gated television camera 12, timing control electronics 14 for controlling laser 10 and camera 12, video processing unit 16, cathode ray tube (CRT) video display unit 18, altimeter 20 and computer 22. Light pulses are emitted from laser 10 (at 20 Hz rate in this embodiment) and the light is passed through a negative focal length lens (not shown) to expand the laser beam into a cone which illuminates a spot at the target scene 14 within medium 16 (water). The shutter of camera 12 is opened briefly after an appropriate delay time such that the image formed by the camera and lens is composed of light backscattered or reflected by the target scene. The video signals from the camera are then processed in video processing unit 16 and displayed on a cathode ray tube 18.

The timing control of lidar system 100 relies upon a signal from the aircraft altimeter 20 to continually provide platform altitude information. Because the timing of the lidar system is under the control of computer 22, the altimeter signal can be interpreted and used to adjust total delay so as to automatically track changing platform altitude. Computer 22 is operatively connected to digital delay generator 14 by a bidirectional parallel interface such as IEEE-488, allowing the computer to set the time delay and width for each camera gating pulse.

The ICCD camera 12 provides standard RS-170 video format output with one field updated every 1/60 second. An internally generated 60 Hz pulse train from camera 12 is frequency divided by a factor of 3 in divider 24 to provide a 20 Hz clock signal for system timing control. The 20 Hz signal is first used to fire the flash lamps in laser 10 and to trigger the fixed 210 microsecond delay generator 26, whose output pulse triggers the laser Q-switch to produce the narrow laser output pulse. In addition, the 20 Hz clock pulses trigger the programmable delay generator 14 and the hardware interrupt line input to computer 22. The computer 22, upon detecting the interrupt signal, performs the following operations. First, it reads the aircraft altitude by an analog-to-digital conversion of the input signal from altimeter 20. Second, the computer calculates the round-trip delay time for light propagation from the laser to the surface of the water:

$$\tau_{air} = (2)(n_{air})(A/c) \tag{1}$$

where:

$n_{air}$ is the index of refraction of air;
A is the altitude reading from FIG. 1;
and c is the vacuum speed of light.

Third, the computer calculates the water depth delay time:

$$\tau_{water} = (2)(n_{water})(D/c) \tag{2}$$

where:

$n_{water}$ is the index of refraction of the medium 16 which is assumed here to be water; and
D is the depth from FIG. 1 of the upper edge of the submerged volume to be imaged.

Fourth, the computer computes the camera exposure time (gate width) corresponding to the thickness $\Delta$ from FIG. 1 of the desired water volume to be imaged:

$$\tau = (2)(n_{water})(D/c) \tag{3}$$

Thus, objects at depths between D and D+$\Delta$ will be imaged by lidar system 100.

Fifth, the computer 22 sends digital commands to programmable delay generator 14 to set the timing delay and output pulse width (which is set to $\tau$ defined above). The programmable delay time is set to the algebraic sum of ($\tau$air)+($\tau$water)+(210 microsec fixed delay)+(laser Q-switch propagation delay)−(delay generator propagation delay)−(camera propagation delay). In practice, a system delay time constant, which is the algebraic sum of the last four constant delays defined above, is actually empirically measured and stored in computer memory for this calculation.

The nominal 210 microsecond lamp-to-laser delay easily allows time for all system delays while keeping the total delay requirement to a small fraction of a pulse. This results in a reduction of the number of delay generators required for camera gating control from two in prior U.S. Pat. No. 4,862,257 to only one in the present invention.

Still another feature of the present invention is the elimination of the demanding stability requirement upon the master clock since pulse-to-pulse timing is no longer critical.

The actual components depicted in FIG. 2 are substantially similar or identical to the corresponding components described in detail in U.S. Pat. No. 4,862,257 and U.S. application Ser. No. 256,778. Accordingly, reference should be made to the detailed descriptions of the pulsed laser 10, ICCD camera 12, Stanford digital delay generator 14, video processor 16 and CRT display 18 in FIGS. 1 and 5 of U.S. Pat. No. 4,862,257 (which are fully and specifically incorporated herein by reference) for a more detailed description. Similarly, the present invention may utilize more than one camera 12 as described in U.S. Pat. No. 4,862,257.

Preferably, computer 22 comprises a VME bus computer and fixed delay generator 26 comprises a AVX-D-3KS1A manufactured by Avtech Electrosystems.

It will be appreciated that the present invention does require the presence of an altimeter on board the airborne platform; and that the altimeter be readable by computer 22. Fortunately, the added requirement for an altimeter signal readable by computer 22 is routinely fulfilled in most aircraft systems. The altimeter range of operation will determine the usable lidar system altitude range; and the resolution of the altimeter will determine accuracy of locating depth of observation. However, the lack of absolute accuracy as well as variance between altimeters can be compensated for with computer 22 following a calibration sequence.

The important differences between the timing control method of the present invention (as depicted in FIG. 2) and that of the prior art becomes quite clear when comparing FIG. 2 of the present application with FIG. 5 of U.S. Pat. No. 4,862,257. Thus, it is easily seen that the present invention eliminates the use of the glint detector as well as one of the delay generators.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of detecting and imaging from an airborne platform an object enveloped by a backscattering medium which is at least partially transmitting to light, the airborne platform having altimeter means associated therewith, including the steps of:
   selectively generating short pulses of light from the airborne platform using a pulsed light source;
   projecting said short pulses of light toward the backscattering medium and at an object enveloped by the backscattering medium;
   using computer means to monitor the altitude of the airborne platform in response to altitude input from the altimeter means, said altitude input being generated independently of said pulsed light source;
   detecting said pulses of light reflected back from said object using camera means, said camera means being gated open by input from delay generator means, said camera means being gated open after a selected time delay corresponding to the round-trip propagation time of said light pulses to and from said object;
   using said computer means to calculate said selected time delay based on input data which includes the altitude input from said altimeter means, said computer means inputting said selected time delay to said delay generator means; and
   converting said detected pulses of light to a video image of said object.

2. The method of claim 1 wherein the backscattering medium comprises water and wherein:
   said time delay calculation is also dependent on the water depth between the water surface and said object.

3. The method of claim 2 wherein said video image is made at a selected detection depth and wherein:
   said detection depth is adjusted for each pulse under control of said computer means to scan a preset range of depths.

4. The method of claim 2 wherein said light is generated by a laser wherein:
   the target depth variation visible in a single image generated from a single laser pulse is adjusted by said computer means on a pulse-to-pulse basis.

5. The method of claim 1 wherein said light is generated by a laser and wherein the backscattering medium comprises water and wherein said selected time delay is calculated by the following:

(Delay 1+Delay2)−(Delay 3+Delay 4)

wherein:
   Delay 1 = round trip delay time for light propagation from the laser to the surface of the water;
   Delay 2 = water depth delay;
   Delay 3 = delay generator means propagation delay; and
   Delay 4 = camera means propagation delay.

6. The method of claim 5 wherein delay 1 is calculated by:

$$\text{Delay } 1 = (2)(n_{air})(A/c)$$

where:
   $n_{air}$ = index of refraction of air;
   A = altitude reading from said altimeter means;
   c = vacuum speed of light.

7. The method of claim 5 wherein delay 2 is calculated by:

$$\text{Delay } 2 = (2)(_{water}n)(D/c)$$

where:
   $n_{water}$ = index of refraction of the water;
   D = depth of water from upper edge of water to submerged volume to be imaged; and
   c = vacuum speed of light.

8. An apparatus for detecting and imaging from an airborne platform an object enveloped by a backscattering medium which is at least partially transmitting to light, the airborne platform having altimeter means associated therewith, comprising:
   pulsed light source generating means for selectively generating short pulses of light from the airborne platform;
   projecting means for projecting said short pulses of light toward the backscattering medium and at an object enveloped by the backscattering medium;
   computer means for monitoring the altitude of the airborne platform in response to altitude input from the altimeter means, said altitude input being generated independently of said pulsed light source generating means;
   camera means for detecting said pulses of light reflected back from said object, said camera means being gated open by input from delay generator means, said camera means being gated open after a selected time delay corresponding to the round-trip propagation time of said light pulses to and from said object;
   said computer means calculating said selected time delay based on input data which includes the altitude input from said altimeter means, said computer means inputting said selected time delay to said delay generator means; and
   converting means for converting said detected pulses of light to a video image of said object.

9. The apparatus of claim 8 wherein the backscattering medium comprises water and including:
    means for adjusting said detection depth for each pulse under control of said computer means to scan a preset range of depths.

10. The apparatus of claim 8 wherein said light is generated by a laser and wherein the backscattering medium comprises water and wherein:
    the target depth variation visible in a single image generated from a single laser pulse is adjusted by said computer means on a pulse-to-pulse basis.

* * * * *